UNITED STATES PATENT OFFICE.

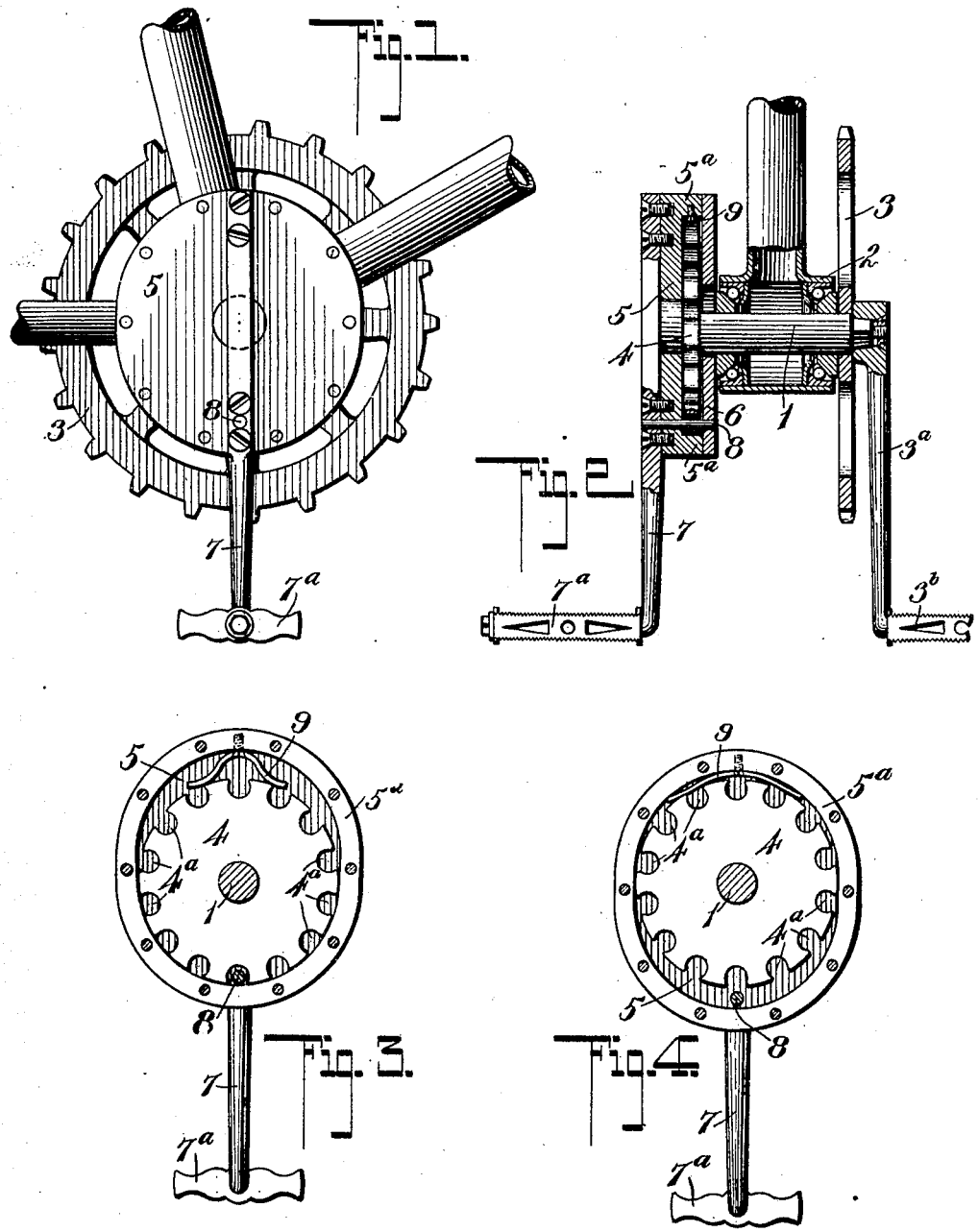

WALTER VAN WIE, OF OAKLAND, CALIFORNIA.

SPRING-RELIEF COASTER.

No. 913,786.     Specification of Letters Patent.     Patented March 2, 1909.

Application filed February 18, 1908. Serial No. 416,541.

*To all whom it may concern:*

Be it known that I, WALTER VAN WIE, a citizen of the United States, residing at Oakland, in the county of Alameda and State of California, have invented a new and useful Improvement in Spring-Relief Coasters, of which the following is a specification.

This invention relates to a spring relief coaster and is intended to be attached to a bicycle provided with one of the ordinary coaster brake sprocket wheels now in ordinary use.

The object of this invention is an attachment to be applied to the other end of the axle whereby the foot pedal carried at said end may also be disengaged from the rotating parts and brought into its lowest position, both pedals occupying similar positions while coasting.

The invention consists of a plate rotatably mounted upon a disk fixed upon the axle, said plate carrying the foot pedal, which term I employ as also including the crank upon which the pedal proper is mounted, and the plate also carries locking means for locking the plate to said disk, said means being disengaged from the disk by downward pressure of the foot when the pedal is in its lowest position.

In the accompanying drawings, Figure 1 is a side elevation of the device in position for use, the pedal being shown in the position occupied while coasting. Fig. 2 is a sectional view taken on the line of the axle, the axle and a disk carried thereby together with portions of the foot pedals being shown in elevation, the parts being also shown in the position occupied by them while coasting. Fig. 3 is a sectional elevation of my attachment, the axle and other parts being shown in section, and the parts being shown in operative position. Fig. 4 is a similar sectional view of the parts being shown in inoperative or coasting position.

In these drawings 1 represents an axle provided with a crank hanger 2, a sprocket wheel 3 and a crank $3^a$ which carries the usual foot pedal $3^b$. These parts are the ones now in common use. Upon the opposite end portion of the axle 1 I fix a notched disk 4 the teeth of which are formed by cutting semi-circular notches $4^a$ in the periphery of the disk. Loosely mounted upon this disk is an elliptical plate 5 provided with an inwardly extending flange $5^a$ which rests loosely upon the disk and the plate 5 is held in place by an inner face plate 6 secured to the flange $5^a$ by suitable screws or other means this face plate having an elongated central opening through which the axle 1 loosely passes. The crank 7 is carried by the plate 5, said crank being parallel to the major axis of the plate and this crank is provided with the usual pedal $7^a$. A pin 8 is carried transversely by an end portion of the plate 5 the ends of the pin being journaled respectively in the plate 5 and in the face cover 6, and for reasons which will appear hereinafter this pin is arranged adjacent the lower portion of the crank 7. To the flange $5^a$ at the end of the plate opposite the pin 8 a flat spring 9 is secured midway its ends, the free end portions of said spring bearing upon the periphery of the disk 4.

The operation of the device is as follows:— The spring 9 will normally assume the position shown in Fig. 3 holding its end of the plate away from the disk wheel 4 and holding the pin 8 in engagement with the notches of the disk, thus locking the plate 5 to the disk. When the rider desires to coast the coaster brake sprocket wheel mounted upon the opposite end of the axle 1 can be operated in the usual manner and as soon as the crank 7 reaches its lowest position, bringing it parallel to the other crank a downward pressure of the foot upon the pedal will compress the spring 9 and draw the spring end of the plate 5 downward thus disengaging the pin 8 from the notch and the said disk will rotate loosely within the flange $5^a$ of the plate 5 thus allowing the rider to coast with both feet in the same position. By releasing downward pressure by the foot upon the pedal the spring will return the plate to its normal position thus again engaging the pin with the lowermost notch thus locking the plate 5 and the crank 7 to the axle. To return the cranks 7 and $3^a$ to their normal positions with respect to each other the crank 7 is held disengaged by pressure of the foot, and the crank $3^a$ is lifted by the usual toe clip carried by the rider, thus bringing the cranks opposite each other, when the foot pressure is released on crank 7 and the spring 9 lifts the pin 8 back into engagement with notched disk 4. As the rear wheel is assumed to be rotating, the device being in motion the only friction to retard the lifting of the crank $3^a$ is the pressure of spring 9 on disk 4. This, however, is greatly reduced by means of a suitable lubricant.

Having thus fully described my invention, what I claim as new and desire to secure by Letters Patent is:—

1. The combination with an axle, of a notched disk fixed thereon, a flanged elliptical plate held loosely on said disk and movable vertically with respect to the disk, a pin carried by said plate for engagement with notches of the disc, a spring arranged in an end of the plate and between the flange and the disk, said spring being diametrically opposite the pin and foot operated means for drawing the pin downwardly out of engagement with the disk.

2. A device of the kind described comprising an axle, a notched disk thereon, a flanged plate loosely carried by said disk, said plate being movable vertically with respect to said disk, means carrried by said plate for engagement with notches of the disk, a spring arranged between the flange and the disk and diametrically opposite the teeth engaging means, and a crank secured to said plate, the said crank extending on a line between the spring and the pin.

3. A device of the kind described comprising an axle, a notched disk fixed thereon, a flanged plate elliptical in outline, the flange of the plate inclosing the periphery of the disk, means for holding said plate in place, a. spring arranged at one end of the major axis of the plate between the flange and the disk, a pin carried by the plate adjacent the opposite end of said axis, and a crank carried by the plate and arranged upon the major axis of the plate, and a pedal carried by siad crank and adjacent the end of the plate carrying the pin.

4. A device of the kind described comprising an axle, a notched disk fixed on said axle, an elliptically flanged plate resting loosely upon said disk, a face plate having an elongated central opening secured to said flange, the axle passing freely through said opening, a spring secured midway its ends to the flange of the first mentioned plate, the free portions of said spring bearing upon the disk, a pin carried by the plate and face cover and diametrically opposite the spring, and a crank and pedal carried by said flanged plate, the pedal being in alinement with the spring and pin.

WALTER VAN WIE.

Witnesses:
E. V. HARTMAN,
D. E. CROUCH.